United States Patent [19]

Steventon et al.

[11] Patent Number: 4,647,980

[45] Date of Patent: Mar. 3, 1987

[54] AIRCRAFT PASSENGER TELEVISION SYSTEM

[75] Inventors: Arnold R. Steventon, Valencia; Robert F. Butler, Encino, both of Calif.

[73] Assignee: Aviation Entertainment Corporation, Valencia, Calif.

[21] Appl. No.: 819,737

[22] Filed: Jan. 21, 1986

[51] Int. Cl.$^4$ ............................................. H04N 5/64
[52] U.S. Cl. ...................................... 358/254; 358/86
[58] Field of Search ................................ 358/254, 86

[56] References Cited

U.S. PATENT DOCUMENTS

| | | | |
|---|---|---|---|
| D. 259,038 | 4/1981 | Smith | D12/195 |
| D. 262,165 | 12/1981 | Andries et al. | D6/64 |
| D. 267,372 | 12/1982 | Long et al. | D6/48 |
| D. 274,728 | 7/1984 | Shibata | D14/113 |
| 1,304,753 | 5/1919 | Dwyer | 155/184 |
| 1,700,337 | 1/1929 | Renner | 387/86 |
| 2,133,151 | 10/1938 | Rittenhouse | 250/14 |
| 2,148,347 | 2/1939 | Gray | 179/1 |
| 2,489,008 | 11/1949 | Callender | 179/1 |
| 2,517,433 | 8/1950 | Hoven et al. | 155/184 |
| 2,629,023 | 2/1953 | La Fitte | 179/146 |
| 2,633,905 | 4/1953 | Geldbaugh | 155/188 |
| 2,908,766 | 10/1959 | Taylor | 179/82 |
| 3,019,050 | 12/1962 | Spielman | 297/217 |
| 3,093,412 | 6/1963 | Gore et al. | 297/217 |
| 3,762,766 | 10/1973 | Barecki et al. | 297/217 |
| 3,795,422 | 3/1974 | Robinson et al. | 297/191 |
| 3,999,014 | 12/1976 | Bascom | 179/1 AT |
| 4,310,307 | 12/1982 | Bellisario | 433/33 |
| 4,428,078 | 1/1984 | Kuo | 455/3 |
| 4,490,842 | 12/1984 | Watannabe | 381/86 |
| 4,501,013 | 2/1985 | Sato | 381/86 |
| 4,521,021 | 6/1985 | Dixon | 358/254 |
| 4,584,603 | 4/1986 | Harrison | 358/254 |
| 4,587,567 | 5/1986 | Yamamori | 358/254 |

FOREIGN PATENT DOCUMENTS 55-92086  7/1980  Japan ................................ 358/254

OTHER PUBLICATIONS

Washington Post, Thursday, Jan. 28, 1982, p. D14, Sony Watchman.

*Primary Examiner*—Michael A. Masinick
*Attorney, Agent, or Firm*—Kelly, Bauersfeld & Lowry

[57] ABSTRACT

A versatile television system is provided for individualized program selection and viewing by aircraft passengers. The system comprises a plurality of compact television receivers mounted respectively in front of each airline passenger, such as in a rearwardly facing position within the passenger seat immediately in front of each passenger. Each television receiver is provided as a lightweight module adapted for rapid, removable installation into a mounting bracket opening rearwardly on the rear side of a passenger seat, with a viewing screen set at a tilt angle accommodating an average reclined position of the seat. Exposed controls permit channel and volume selection by the individual passenger, and an audio headset is provided for plug-in connection to the module. A broadcast station on the aircraft provides prerecorded and/or locally received programs on different channels to each television module for individual passenger selection.

31 Claims, 9 Drawing Figures

AIRCRAFT PASSENGER TELEVISION SYSTEM

BACKGROUND OF THE INVENTION

This invention relates generally to on-board aircraft entertainment systems and the like. More specifically, this invention relates to an improved television system permitting individualized television program selection and viewing by aircraft passengers.

On-board video systems are known in the art for entertainment of aircraft passengers. Such video systems have become popular in recent years for providing movies and other video programming for entertaining passengers during the course of an aircraft flight. The inclusion of video entertainment during the flight has constituted an effective airline marketing tool and provides the further benefits of reducing passenger fatigue and maintaining many passengers in their seats during a flight.

In the past, video entertainment systems on aircraft have utilized a movie screen or television receiver of relatively large size installed within the aircraft cabin in a centralized location for simultaneous viewing by many aircraft passengers. In this regard, the use of on-board video entertainment systems has been restricted to relatively large aircraft having sufficient cabin volume to accommodate substantially unobstructed viewing of the video programming by many passengers. However, this arrangement does not provide alternative video entertainment for those passengers who do not wish to watch the video program selected by airline personnel. Moreover, no satisfactory video entertainment system has been provided for use with smaller aircraft of the type used for most relatively short range commercial flights and which do not have sufficient cabin volume to accommodate a traditional large movie screen or television receiver.

There exists, therefore, a significant need for an improved on-board video entertainment system adapted for use with aircraft of substantially any size and wherein each passenger is provided with alternative program selection capability. The present invention fulfills these needs and provides further related advantages.

SUMMARY OF THE INVENTION

In accordance with the invention, an improved video system is provided for on-baord entertainment of airline passengers. The improved system includes a plurality of compact television receiver modules mounted for individual viewing by aircraft passengers. The television modules are adapted to receive on different channels a plurality of different video programs, with each television module including channel selection means operable by the individual airline passenger.

In one preferred form of the invention, the television modules each include a compact televison receiver particularly such as a compact color television having a liquid crystal display screen and relatively low power requirements. The television receiver is installed within a lightweight chassis to form the module adapted for rapid and removable nested connection within a matingly shaped mounting bracket installed in a rearwardly opening position in front of an airline passenger, for example, by installation of the mounting bracket within an airline passenger seat immediately in front of the individual passenger. The television screen is angularly oriented within the chassis at a selected tilt angle which is generally complementary to the average reclined angle of the passenger seat thereby orienting the screen at or near a substantially vertical attitude for passenger viewing.

Each television module includes one or more plug-in fittings for rapid engagement with connector fittings on the mounting bracket to couple the receiver to a power source and multiple video program signals broadcast on different channels. When seated within the mounting bracket, the module is adapted to support one or more cushion members to reduce risk of passenger injury upon impact therewith and further to blend with conventional seat fabric in an attractive manner. The cushion members and seat fabric cooperatively define a central opening exposing the recessed television scree and adjacent controls, such as channel selection, volume and/or brightness controls. An audio headset including lightweight earphones is provided with each television module for plug-in connection thereto to provide individualized audio signals to each passenger.

A central broadcast station on the aircraft is coupled by one or more appropriate cables to each of the plurality of television modules. This broadcast station provides an appropriate power source for each module and further includes means for supplying a plurality of different program signals on different channels. These program signals may be obtained by playback of prerecorded video cassettes or the like and/or locally received programs broadcast in the geographical vicinity of the aircraft. Each passenger may optionally select one of these multiple programs for individualized viewing substantially without disturbing other passengers.

Further advantages and features of the invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
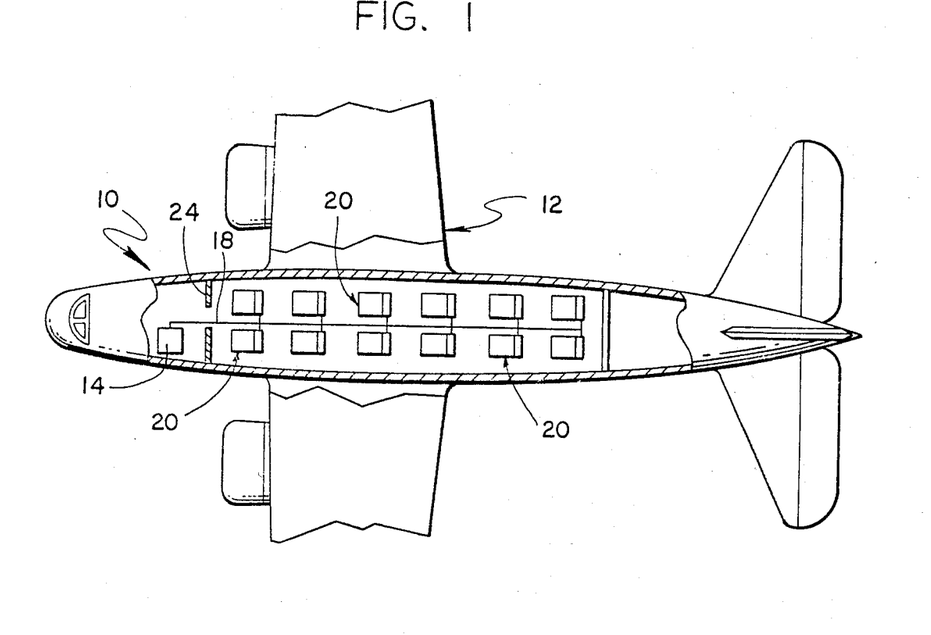
FIG. 1 is a fragmented top plan view illustrating, in somewhat schematic form, an improved aircraft passenger television system embodying the novel features of the invention.
Figure 2:
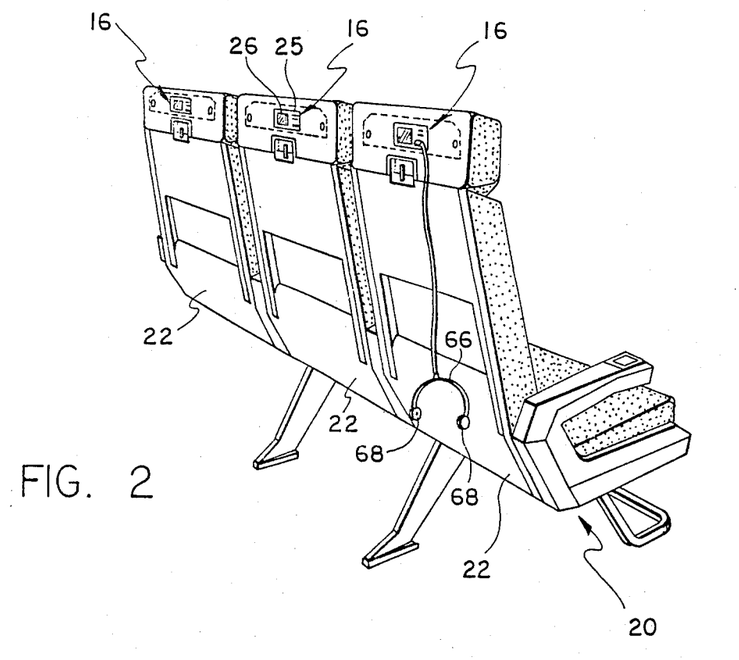
FIG. 2 is a rear perspective view illustrating a row of aircraft passenger seats each including a television receiver module according to the invention.
Figure 3:
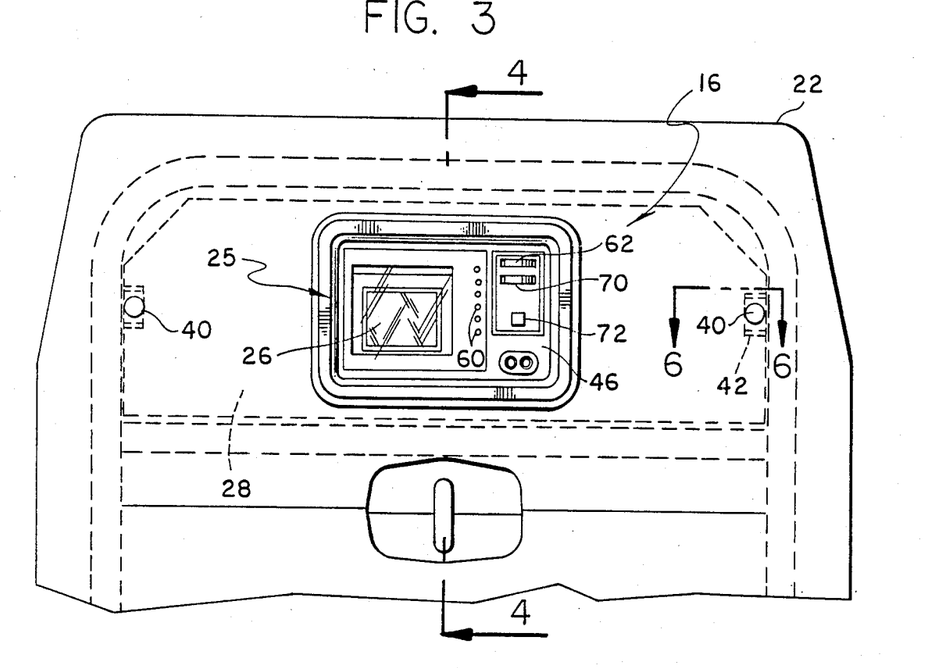
FIG. 3 is an enlarged fragmented rear elevation view of the television module installed within a passenger seat.

As shown in the exemplary drawings, an on-board television system referred to generally by the reference numeral 10 is installed within an aircraft 12 to provide individualized video entertainment for a plurality of aircraft passengers. As shown in FIGS. 1 and 2, the television system 10 includes a central broadcast station 14 on the aircraft 12 and adapted to supply multiple video program signals on different channels to each of a plurality of compact television receiver modules 16 mounted for individual selection and viewing by the aircraft passengers.

The on-board television system 10 of the present invention provides each aircraft passenger with a broad range of video program options which can be selected and controlled by the individual passenger. The system 10 thus improved significantly upon prior art aircraft video systems wherein the video entertainment is restricted to a single program or movie which normally does not meet the taste preferences and is therefor enot observed by many passengers. Moreover, by providing the individual compact television modules 16, the present invention avoids the need for a large movie or television screen at a centralized location within an aircraft cabin and accompanying umimpaired sight lines for passenger viewing, wherein these requirements have limited previous video systems to relatively large aircraft. Instead, the compact television modules 16 are located at each passenger seat location for close range, individualized viewing to permit use of the system on passenger-carrying aircraft of virtually any size.

As shown generally in FIG. 1, the improved television system 10 includes the central broadcast station 14 located at a convenient on-board position for access by aircraft personnel. The broadcast station 14 includes means for supplying a plurality of different video program signals on different channels to one or moer cables 18 which carry the signals to each passenger seat location, for example, by branching off at each row 20 of seats. As shown in FIG. 2, each seat row 20 commonly includes a plurality of side-by side passenger seats 22, with each seat 22 having one of the compact television modules 16 mounted therein in a rearwardly facing position for close-range viewing by the passenger seated in the seat and row immediately therebehind. For passengers seated in a row 20 at the front of the aircraft (FIG. 1), additional cable branches can be provided for connection to additional television modules (not shown) mounted within a bulkhead wall 24 at the front of a passenger cabin.

In one preferred form, each television module 16 is sized and shaped for rapid, removable installation into a respective one of the aircraft passenger seats 22 in an otherwise out-of-the-way position, such as within the headrest portion of the seat, as shown in FIG. 2. Each module 16 includes a compact television receiver 25 designed for relatively low power consumption and for signal requirements compatible with aircraft use and without interfering with required aircraft radio and navigational functions. A preferred television receiver comprises a receiver having a color liquid crystal display (LCD) screen 26 of generally rectangular shape with a diagonal screen measurement of about two to four inches, and most preferably about two and one-half inches.

As shown in FIGS. 2-7, the television receiver 25 is securely mounted within a relatively lightweight housing or chassis 28 adapted for rapid removable nested attachment into a rearwardly open mounting bracket 30 within the passenger seat 22. More particularly, the seat 22 includes an interanl frame 32 covered by appropriate cushion and outer fabric materials to comfortably support a passenger without significant unpadded protrusions of the like which could result in passenger injury upon impact therewith. The upper rear side of the seat headrest portion is normally open to define a chamber for reception of the mounting bracket 30 which is securely fastened to the seat frame 32 by rivets 34 or other suitable fastening means. The mounting bracket in turn defines a rearwardly open can for nested reception of one of the television modules 16.

Figure 4:
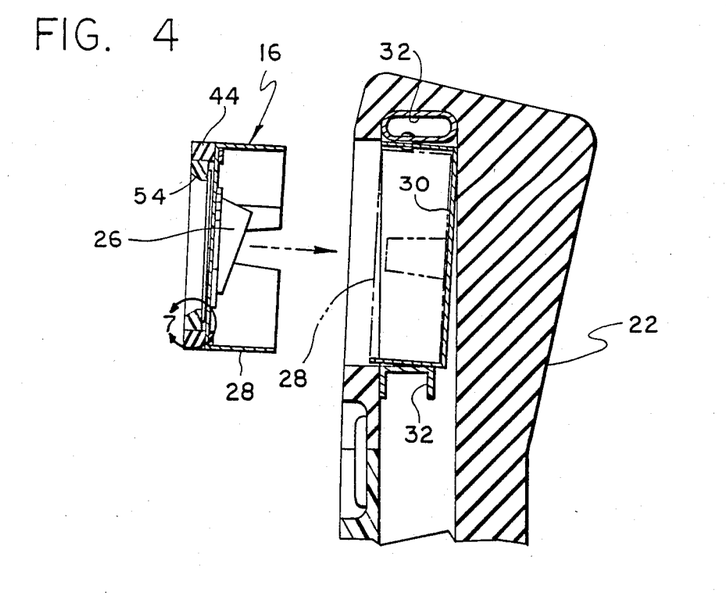
FIG. 4 is an enlarged, exploded, fragmented vertical sectional view taken generally on the line 4—4 of FIG. 3.

Each television module 16 including the chassis 28 is sized and shaped for smooth and easy sliding reception into the rearwardly open mounting bracket 30, as shown in FIG. 4. Prior to such reception, however, one or more plug-in fittings 36 on the television receiver 25 are mated with appropriate connector fittings 38 within the mounting bracket to couple the receiver to a power source and the signal-carrying cable 18 (FIG. 1) Fasteners 40 are provided on the chassis 28 for locking with sockets 42 on the mounting bracket 30 to lock the module in place. These fasteners may take different forms, although quick-connect fasteners are preferred, such as the fastener marketed under the name CAMLOC by Rexnord Specialty Fastener Division, Hasbruck Heights, N.J.

A relatively thick foam cushion or pad 44 is mounted over the rear face of the modular chassis 28 to provide a resilient structure protecting against passenger injury in the event of impact with the module. As shown best in FIGS. 5 and 7, this foam pad 44 includes a central opening 45 sized to expose the compact receiver 25 including the screen 26 and a closely adjacent control panel 46 which will be described in more detail. The foam pad can be mounted onto the chassis 28 in any suitable manner, such as by use of the illustrative pressure-sensitive adhesive 47 on the side of the pad facing the chassis. Importantly, the pad 44 has sufficient thickness to recess the receiver 25 substantially from the rear plane of the seat which generally coincides with the rear plane of the pad to further minimize risk of injury-causing impact with a passenger.

Figure 5:
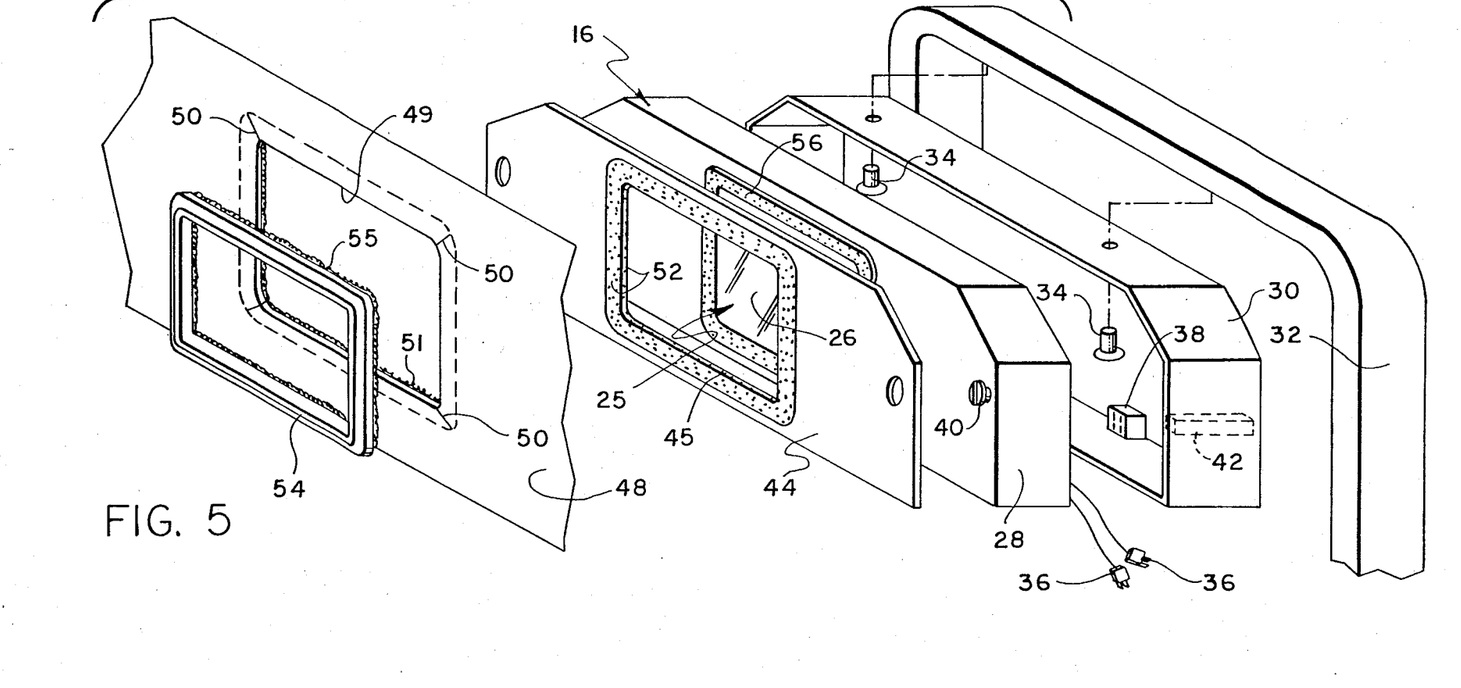
FIG. 5 is an exploded fragmented perspective view illustrating mounting of the television module within a passenger seat.
Figure 6:
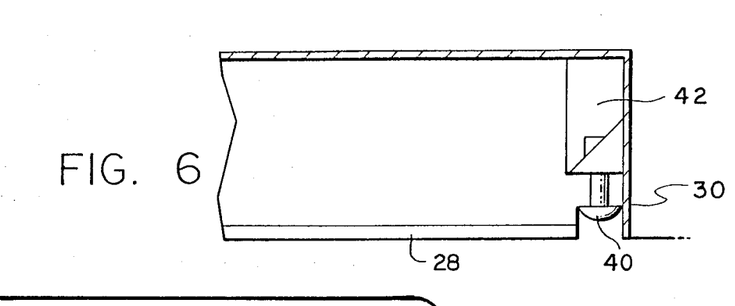
FIG. 6 is an enlarged fragmented horizontal sectional view taken generally on the line 6—6 of FIG. 3.
Figure 7:
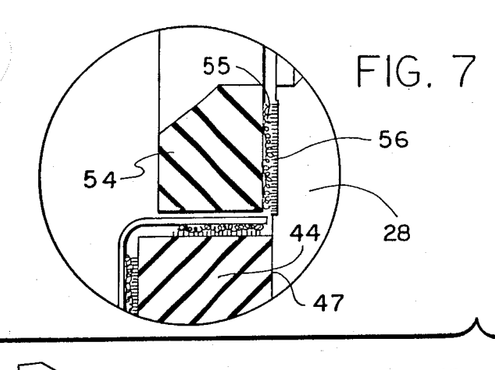
FIG. 7 is an enlarged fragmented vertical sectioanl view corresponding with the encircled region 7 of FIG. 4.

For optimum appearance, the central opening 45 of the foam pad is adapted for attachment with overlying seat fabric 48. As shown in FIGS. 5 and 7, a flap of the seat fabric 48 is draped over the television module 16 and the foam pad 44, with a rectangular fabric opening 49 aligned with the pad opening 45 to expose the television screen 26 and adjacent control panel 46. The fabric 48 includes short cut slits 50 at the corners of the opening 49 to define narrow fabric flaps to fold inwardly over the margins of the central pad opening 45. Fastening means such as interlocking Velcro strips 51 and 52 on the fabric 48 and the pad 44 securely attach the seat fabric 48 onto the pad.

A bezel 54 of relatively rigid yet somewhat resilient foam is also provided and fits closely through the fabric opening 49 and the pad opening 45. This bezel 54 locks onto the rear side of the module in a position bordering the screen 26 and adjacent control panel 46. Appropriate fastening means such as additional Velcro strips 55 and 56 on the bezel 54 and module 16 securely lock the bezel in place for providing a stury support bordering the fabric and pad openings.

When installed into the passenger seat 22, the television module 16 advantageously supports the television screen 26 at a tilt angle relative to the rear plane of the seat. More particularly, as shown best in FIG. 4, the screen 26 is tilted upwardly and forwardly from its lowermost margin at an angle of about fifteen degrees. With this orientation, the screen 26 is tilted to complement an average range of seatback reclining to maintain the scren sufficiently in a vertical attitude for easy passenger viewing. That is, throughout a normal range of seatback reclining, the viewing screen 26 of the television receiver will be tilted slightly forwardly in the upright seatback position to slightly rearwardly in a fully reclined seatback position, with a nearly vertical attitude at an average partially reclined seatback position.

Figure 8:
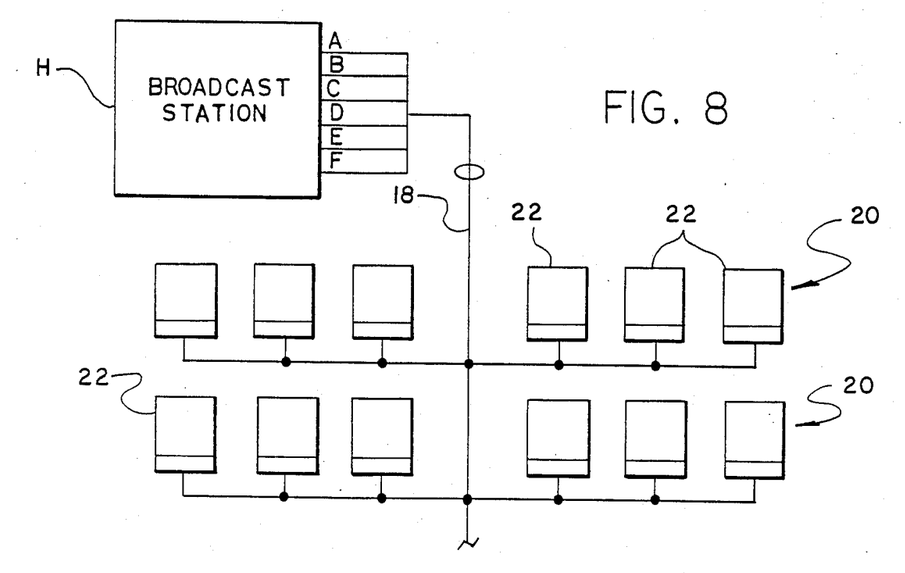
FIG. 8 is a schematic diagram illustrating one preferred arrangement for coupling a plurality of the television modules with a central broadcast station.
Figure 9:
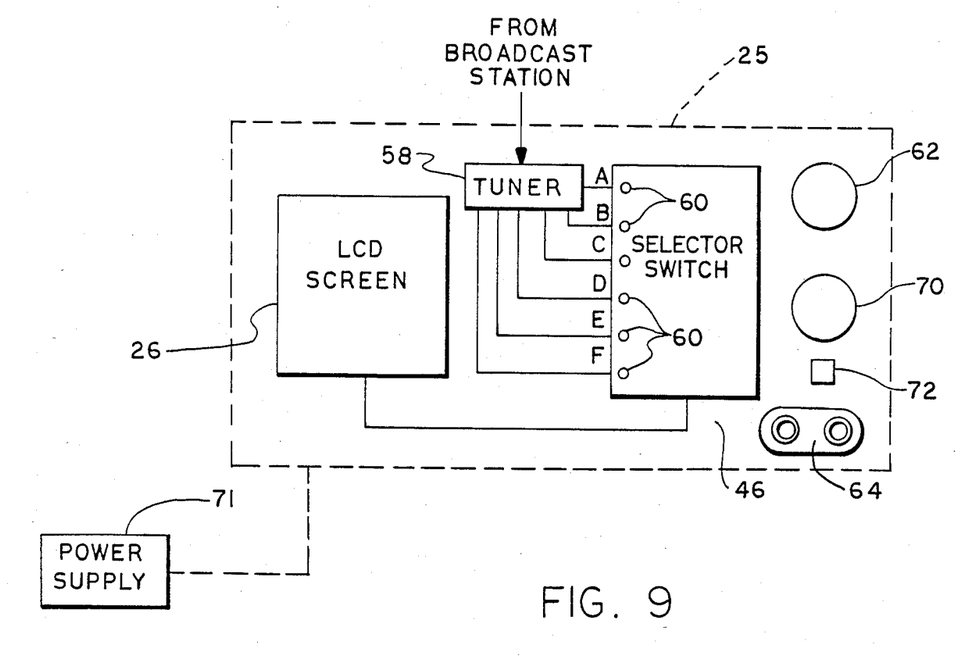
FIG. 9 is a schematic diagram illustrating one of the television modules and operation thereof for individual channel selection by each passenger.

In operation, a plurality of different video programs are sent by the broadcast station 14 over the cable 18 to each passenger seat 22, with six different programs being referred to by the letters A through F in the schematic diagram of FIG. 8. At each passenger seat, the program signals are coupled to the receiver 25 of the television module. As depicted in FIG. 9, each receiver 25 includes a tuner 58 for coupling a selected one of the program signals for display on the screen 26, in accordance with passenger-activated depression of one of a plurality of channel selector pushbuttons 60 exposed on the control panel 46. Accordingly, each passenger can individually select one of the programs for viewing, or alternate between programs, as desired.

Additional passenger controls for enhanced enjoyment of the video programming are also provided on the control panel 46. For example, a rotatable volume control dial 62 is provided for controlling the volume of an audio signal. This audio signal is supplied via an audio jack 64 on the control panel for plug-in reception of a standard headset 66 (FIG. 2) including earphones 68 for private listening enjoyment without disturbing nearby passengers. A separate control dial 70 for brightness control of the picture displayed on the screen 26 may also be provided, as well as an on-off switch 72.

The television system 10 of the present invention thus provides a highly versatile video entertainment system for individualized passenger selection and viewing. The system thus provides an airline with a significant marketing tool by virtue of the availability of multiple programs. Moreover, by providing more passengers with video entertainment, a higher proportion of passengers on a flight will tend to remain seated for longer periods of time, resulting in greater overall safety. Still further, the system is adapted for use with virtually any size of aircraft and can thus be used on relatively small aircraft on whcih video entertainment has not heretofore been available.

A wide variety of modifications to the system described herein will be apparent to those skilled in the art. For example, the broadcast station 14 can be adapted to supply multiple programs by playback of multiple prerecorded cassettes. Alternatively, the station 14 can be designed to supply multiple programs of local broadcast origin within the geographical vicinity of the aircraft, or, if desired, a combination of prerecorded and local programming. Still further, the system is readily adapted to pilot or crew interruption for announcements and the like, as required during the course of a flight. Moreover, the modules can be adapted to receive power from a separate power supply 71, as viewed in FIG. 9, or they may receiver power directly from the central broadcast station 14.

Accordingly, no limitation on the invention is intended by way of the description herein, except as set forth in the appended claims.

What is claimed is:

1. An aircraft passenger television system for use in combination with an aircraft having a pluarlity of passenger seats, comprising:
   a plurality of television modules each having a viewing screen;
   means for mounting said plurality of television modules each upon a respective one of said seats with said viewing screen visible from behind said seat; and
   means on the aircraft for coupling a plurality of television signals corresponding with a respective plurality of differnet video programs on respective different channels to each of said television modules;
   each of said television modules including channel selection means for permitting individual passenger selection and viewing of one of said plurality of video programs.

2. The aircraft passenger television system of claim 1 wherein each of said television modules further includes audio means comprising an audio headset with at least one earphone and a volume control.

3. The aircraft passenger television system of claim 2 wherein each of said television modules includes an audio jack, said headset being releasably connectable to said audio jack.

4. The aircraft passenger television system of claim 1 wherein each of said television modules includes a control panel accessible from behind said respective seat, said viewing screen and said control panel being recessed from a rear plane of said respective seat, and cushioned means on said seat generally surrounding said control panel.

5. The aircraft passenger television system of claim 1 wherein each of said television modules is mounted within the upper rear side of a headrest portion of said respective seat.

6. The aircraft passenger television system of claim 5 wherein each of said television modules is removably mounted with said respective seat, said coupling means and said television module including mating fittings for releasable interconnection prior to mounting of said module with said seat.

7. The aircraft passenger television system of claim 1 wherein at least some of said seats are adapted for adjustment between generally upright and reclined positions, said viewing screen of each said television modules being set at a tilt angle generally for complementing said adjustment of said respective seat.

8. The aircraft passenger television system of claim 7 wherein said viewing screen is set to tilt upwardly and forwardly from its lower margin when said respective seat is in the upright position.

9. The aircraft passenger television system of claim 8 wherein said viewing screen is set to tilt upwardly and rearwardly from its lower margin when said respective seat is in a fully reclined position.

10. The aircraft passenger television system of claim 7 wherein said tilt angle is about 15 degrees.

11. The aircraft passenger television system of claim 1 wherein said viewing screen is a liquid crystal display.

12. The aircraft passenger television system of claim 1 wherein each of said passenger seats has a rearwardly open chamber formed in a headrest portion thereof, said mounting means comprising a rearwardly open mounting bracket secured to said seat within said chamber, each of said television modules including a chassis sized and shaped to fit into said mounting bracket, and means for releasably locking said module within said mounting bracket.

13. The aircraft passenger television system of claim 12 further including a resilient pad overlying said module and having a central opening therein for rearwardly exposing said viewing screen and a module control panel, seat fabric draped over said pad and said module and having an opening therein generally aligned with said pad central opening, and a bezel secured to said module and lining said seat fabric and pad openings.

14. An aircraft passenger television system for use in combination with an aircraft having a plurality of passenger seats, comprising:
a plurality of television modules each having a relatively small viewing screen, and a control panel including an audio output jack, a volume control, and means for selecting one of a plurality of video programs received by the television module on a plurality of different channels;
a headset for plug-in connection to said audio output jack and including at least one earphone;
means for mounting said plurality of television modules each upon a respective one of said seats with said viewing screen visible and said control panel accessible from behind said respective seat; and
means on the aircraft for coupling a plurality of television program signals on respective different channels to each of said television modules.

15. The aircraft passenger television system of claim 14 wherein each of said television modules is mounted within the upper rear side of a headrest portion of said respective seat.

16. The aircraft passenger television system of claim 14 wherein at least some of said seats are adapted for adjustment between generally upright and reclined positions, and viewing screen of each said television modules being set at a tilt angle generally for complementing said adjustment of said respective seat.

17. An aircraft passenger television system for use in combination with an aircraft having a plurality of passenger seats, comprising:
a plurality of television modules each having a relatively small viewing screen;
means for mounting each of said television modules in respective positions for individualized passenger viewing while seated in their respective passenger seats; and
a broadcast station on the aircraft for coupling a plurality of television program signals on respective different channels to each of said television modules;
each of said modules including channel selection means accessible to and operable by the passenger viewing said module.

18. The aircraft passenger television system of claim 17 wherein each of said television modules further includes audio means comprising an audio headset with at least one earphone and a volume control.

19. The aircraft passenger television system of claim 17 wherein said broadcast station includes means for playback on different channels of a plurality of prerecorded video programs.

20. The aircraft passenger television system of claim 19 wherein said broadcast station further includes means for receiving television signals braodcast in the geographical vicinity of the aircraft and coupling at least one of said received signals on a selected channel to said modules.

21. An aircraft passenger seat and television module combination, comprising:
a seat having a generally upright seatback with a rearwardly open chamber formed therein;
a rearwardly open mounting bracket secured to said seat within said chamber; and
a television module removably receivable into said mounting bracket and having a relatively small viewing screen visible from behind said seat.

22. The combination of claim 21 further including at least one quick release fastener for removably locking said module within said bracket.

23. The combination of claim 21 wherein said viewing screen is a liquid crystal display.

24. The combination of claim 21 wherein said module includes a multiple channel tuner, and a control panel including channel section means accessible from behind said seat.

25. The combination of claim 24 wherein said control panel includes an audio output jack and volume control, and further including an audio headset for plug-in connection to said jack and at least one earphone.

26. The combination of claim 24 wherein said control panel further includes a brightness control.

27. The combination of claim 24 wherein aid control panel further includes an on-off switch.

28. The combination of claim 21 wherein said seatback is adjustable between a generally upright and a reclined position, said viewing screen being set at a tilt angle relative to said seatback whereby said screen is tilted upwardly and forwardly from said lower margin when said seatback is in said upright position, said tilt angle diminishing upon movement of said seatback toward said reclined position.

29. The combination of claim 21 further including a resilient pad overlying said module and having a central opening therein for rearwardly exposing said viewing screen and a module control panel, seat fabric draped over said pad and said module and having an opening therein generally aligned with said pad central opening, and a bezel secured to said module and lining said seat fabric and pad openings.

30. A vehicle passenger seat and television module combination, comprising:
a seat having a generally upright seatback with a rearwardly open chamber formed therein;
a rearwardly open mounting bracket secured to said seat within said chamber; and
a television module removably receivable into said mounting bracket and having a relatively small viewing screen visible from behind said seat.

31. A passenger television system for use in combination with a passenger vehicle having a pluraltiy of rows of passenger seats, comprising:
a plurality of television modules each having a relatively small viewing screen, and a control panel including an audio output jack, a volume control, and means for selecting one of a plurality of video programs received by the television module on a plurality of different channels;

a headset for plug-in connection to said audio output jack and including at least one earphone;

means for mounting said plurality of television modules each upon a respective one of said seats with said viewing screen visible and said control panel accessible from behind said respective seat; and means on the vehicle for coupling a plurality of television program signals on respective different channels to each of said television modules.

* * * * *

REEXAMINATION CERTIFICATE (1078th)
United States Patent [19]
Steventon et al.

[11] B1 4,647,980
[45] Certificate Issued    Jun. 13, 1989

[54] AIRCRAFT PASSENGER TELEVISION SYSTEM

[75] Inventors: Arnold R. Steventon, Valencia; Robert F. Butler, Encino, both of Calif.

[73] Assignee: Aviation Entertainment Corporation, Valencia, Calif.

Reexamination Request:
No. 90/001,437, Feb. 17, 1988

Reexamination Certificate for:
| Patent No.: | 4,647,980 |
|---|---|
| Issued: | Mar. 3, 1987 |
| Appl. No.: | 819,737 |
| Filed: | Jan. 21, 1986 |

[51] Int. Cl.⁴ .............................................. H04N 5/64
[52] U.S. Cl. ..................................... 358/254; 358/86
[58] Field of Search .................................. 358/254, 86

[56] References Cited

U.S. PATENT DOCUMENTS

| 4,521,021 | 6/1985 | Dixon | 273/148 B |
|---|---|---|---|
| 4,584,603 | 4/1986 | Harrison | 358/86 |
| 4,630,821 | 12/1986 | Greenwald | 273/85 |

FOREIGN PATENT DOCUMENTS

| 0230280 | 10/1987 | European Pat. Off. . |
|---|---|---|
| B60R11/02 | 11/1984 | Fed. Rep. of Germany . |
| 2135182 | 8/1984 | United Kingdom . |
| 216880A | 6/1986 | United Kingdom . |

OTHER PUBLICATIONS

Boeing, "Proceedings of the SCAR Conference", Part 2, held at Langley Research Center, Hampton, Virginia, Nov. 9-12, 1976-NASA CP-001-copy in NASA library and open to public as of Dec. 8, 1977, (Comprises cover page, p. iii and pp. 854 to 864, inclusive. and Cinema/video film entitled "2001-A Space Odessey", Metro Goldwyn-Mayer, Inc., copyright 1968 (starts with space ship about 19 minutes into film), several photographs of displayed portion of film are included. Trumbull, "Creating Special Effects for 2001, A Space Odyssey", American Cinematographer, Jun. 1968, pp. 416-418, 451-454, 459-461, (note particularly p. 459).

*Primary Examiner*—Michael A. Masinick
*Attorney, Agent, or Firm*—Kelly, Bauersfeld & Lowry

[57] ABSTRACT

A versatile television system is provided for individualized program selection and viewing by aircraft passengers. The system comprises a plurality of compact television receivers mounted respectively in front of each airline passenger, such as in a rearwardly facing position within the passenger seat immediately in front of each passenger. Each television receiver is provided as a lightweight module adapted for rapid, removable installation into a mounting bracket opening rearwardly on the rear side of a passenger seat, with a viewing screen set at a tilt angle accommodating an average reclined position of the seat. Exposed controls permit channel and volume selection by the individual passenger, and an audio headset is provided for plug-in connection to the module. A broadcast station on the aircraft provides prerecorded and/or locally received programs on different channels to each television module for individual passenger selection.

[B1 4,647,980]

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21-30 is confirmed.

Claims 5, 6, 16 and 20 are cancelled.

Claims 1, 7, 12, 14, 17 and 31 are determined to be patentable as amended.

Claims 2-4, 8-11, 13, 15, 18 and 19, dependent on an amended claim, are determined to be patentable.

New claims 32-35 are added and determined to be patentable.

1. An aircraft passenger television system for use in combination with an aircraft having a [pluarlity] *plurality* of passenger seats, comprising:
 a plurality of television modules each having a viewing screen;
 means for mounting said plurality of television modules each upon a respective one of said seats with said viewing screen visible from behind said seat, *each of said television modules being mounted within the upper rear side of a headrest portion of said respective seat*; and
 means on the aircraft for coupling a plurality of television signals corresponding with a respective plurality of [differnet] *different* video programs on respective different channels to each of said television modules;
 *each of said television modules being removably mounted with said respective seat, said coupling means and said television module including mating fittings for releasable interconnection prior to mounting of said module with said seat;*
 each of said television modules including channel selection means for permitting individual passenger selection and viewing of one of said plurality of video programs.

7. *An aircraft passenger television system for use in combination with an aircraft having a plurality of passenger seats, comprising:*
 *a plurality of television modules each having a viewing screen;*
 *means for mounting said plurality of television modules each upon a respective one of said seats with said viewing screen visible from behind said seat; and*
 *means on the aircraft for coupling a plurality of television signals corresponding with a respective plurality of different video programs on respective different channels to each of said television modules;*
 *each of said television modules including channel selection means for permitting individual passenger selection and viewing of one of said plurality of video programs;*
 [The aircraft passenger television system of claim 1 wherein] at least some of said seats [are] *being* adapted for adjustment between generally upright and reclined positions, said viewing screen of each said television modules being set at a tilt angle generally for complimenting said adjustment of said respective seat.

12. *An aircraft passenger television system for use in combination with an aircraft having a plurality of passenger seats, comprising:*
 *a plurality of television modules each having a viewing screen;*
 *means for mounting said plurality of television modules each upon a respective one of said seats with said viewing screen visible from behind said seat; and*
 *means on the aircraft for coupling a plurality of television signals corresponding with a respective plurality of different video programs on respective different channels to each of said television modules;*
 *each of said television modules including channel selection means for permitting individual passenger selection and viewing of one of said plurality of video programs;*
 [The aircraft passenger television system of claim 1 wherein] each of said passenger seats [has] *having* a rearwardly open chamber formed in a headrest portion thereof, said mounting means comprising a rearwardly open mounting bracket secured to said seat within said chamber, each of said television modules including a chassis sized and shaped to fit into said mounting bracket, and means for releasably locking said module within said mounting bracket.

14. An aircraft passenger television system for use in combination with an aircraft having a plurality of passenger seats, comprising:
 a plurality of television modules each having a relatively small viewing screen, and a control panel including an audio output jack, a volume control, and means for selecting one of a plurality of video programs received by the television module on a plurality of different channels;
 a headset for plug-in connection to said audio output jack and including at least one earphone;
 means for mounting said plurality of television modules each upon a respective one of said seats with said viewing screen visible and said control panel accessible from behind said respective seat; and
 means on the aircraft for coupling a plurality of television program signals on respective different channels to each of said television modules [.] *;*
 *at least some of said seats being adapted for adjustment between generally upright and reclined positions, said viewing screen of each said television modules being set at a tilt angle generally for complementing said adjustment of said respective seat.*

17. An aircraft passenger television system for use in combination with an aircraft having a plurality of passenger seats, comprising;
 a plurality of television modules each having a relatively small viewing screen;
 means for mounting each of said television modules in respective positions for individualized passenger viewing while seated in their respective passenger seats; and a broadcast station on the aircraft for coupling a plurality of television program signals on respective different channels to each of said television modules;

each of said modules including channel selection means accessible to and operable by the passenger viewing said module[.];

*said broadcast station further including means for receiving television signals broadcast in the geographical vicinity of the aircraft and coupling at least one of said received signals on a selected channel to said modules.*

31. A passenger television system for use in combination with a passenger vehicle having a plurality of rows of passenger seats, comprising:

a plurality of television modules each having a relatively small viewing screen, and a control panel including an audio output jack, a volume control, and means for selecting one of a plurality of video programs received by the television module on a plurality of different channels;

a headset for plug-in connection to said audio output jack and including at least one earphone;

means for mounting said plurality of television modules each upon a respective one of said seats with said viewing screen visible and said control panel accessible from behind said respective seat, *each of said television modules being mounted with the upper rear side of a headset portion of said respective seat*; and means on the vehicle for coupling a plurality of television program signals on respective different channels to each of said television modules[.];

*each of said television modules being removably mounted with said respective seat, said coupling means and said television module including mating fittings for releasable interconnection prior to mounting of said module with said seat.*

32. *An aircraft passenger television system for use in combination with an aircraft having a plurality of passenger seats, comprising;*

*a plurality of television modules each having a viewing screen;*

*bracket means for removably mounting said plurality of television modules each upon an upper rear side of a headrest portion of a respective one of said seats with said viewing screen visible from behind said seat; and*

*means on the aircraft for coupling a plurality of television signals corresponding with a respective plurality of different video programs on respective different channels to each of said television modules, said coupling means and each of said television modules including releasable interconnecting mating fittings for coupling said signals to said television modules;*

*each of said television modules including channel selection means for permitting individual passenger selection and viewing of one of said plurality of video programs.*

33. *The combination of claim 32 wherein said bracket means for each of said television modules defines a rearwardly open chamber for removable reception of one of said television modules, and fastener means for removably mounting said one television module within said chamber.*

34. *The combination of claim 33 wherein said fastener means comprises at least one quick release fastener.*

35. *The combination of claim 33 further including a resilient pad overlying said one television module and having a central opening therein for rearwardly exposing said viewing screen and a module control panel, seat fabric draped over said pad and said one television module and having an opening therein generally aligned with said pad central opening, and a bezel secured to said one module and lining said seat fabric and pad openings.*

* * * * *